Aug. 16, 1966   W. W. MISSON   3,266,332
INSTRUMENTATION TRANSMISSION APPARATUS
Filed Dec. 12, 1963
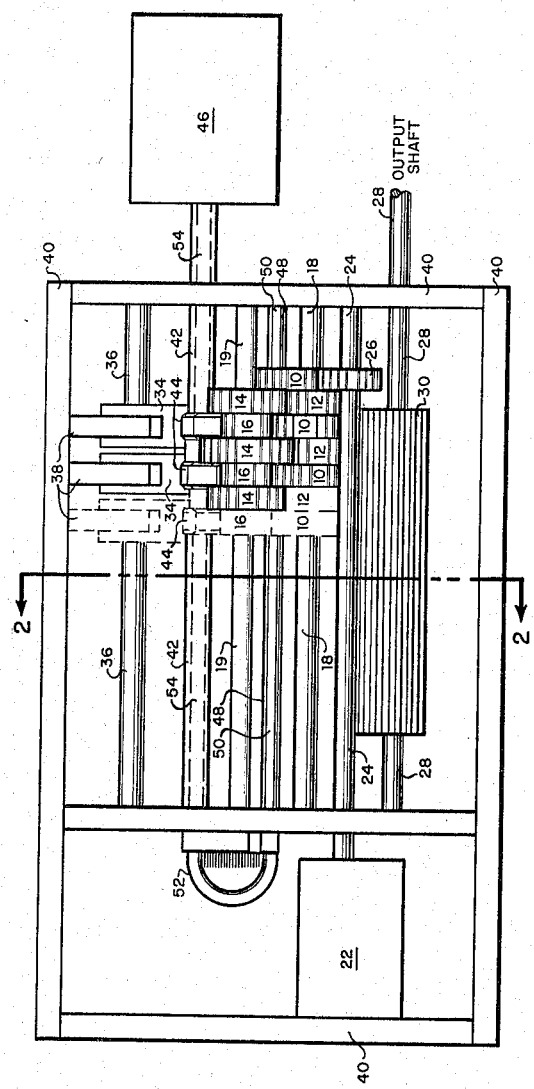
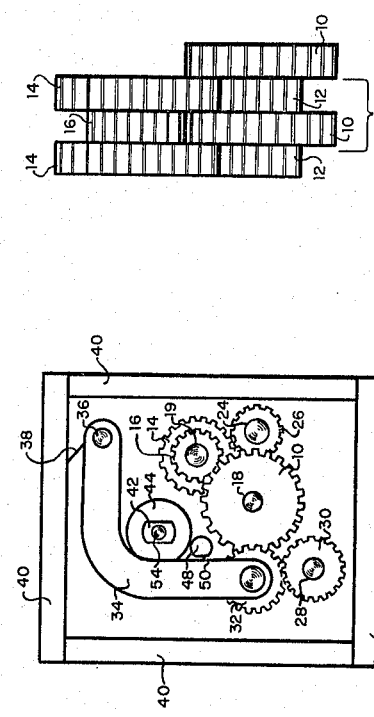
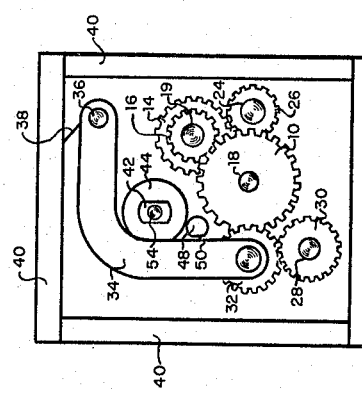
INVENTOR
WILLIAM W. MISSON
BY  *A. C. Smith*
AGENT United States Patent Office 3,266,332
Patented August 16, 1966

3,266,332
INSTRUMENTATION TRANSMISSION APPARATUS
William W. Mission, Mountain View, Calif., assignor to
Hewlett-Packard Company, Palo Alto, Calif., a corporation of California
Filed Dec. 12, 1963, Ser. No. 330,064
10 Claims. (Cl. 74—354)

This invention relates to instrumentation transmissions and more particularly to multispeed transmission apparatus for use in the chart drives of graphic recorders.

Multispeed transmissions used in the chart drives of graphic recorders typically include a gear train which provides selected rotational speeds at successive positions therealong. These selected rotational speeds are imparted to an output drive by means of an idler gear which is displaced longitudinally along the gear train and brought into engagement therewith at corresponding positions. This longitudinal displacement of the idler gear each time a different rotational speed is desired requires an unnecessary amount of time and force. In addition the apparatus required to provide this displacement adds to the bulkiness of the multispeed transmission. Further, the pushbutton or lever arrangements generally used to actuate this apparatus take up large amounts of valuable panel space.

It is the principal object of this invention to provide a multispeed transmission for use in the chart drives of graphic recorders which conserves both time and force. It is another object of this invention to provide a multispeed transmission for use in instrumentation which is compact in size. Still another object of this invention is to provide a transmission for use in instrumentation which provides selected rotational speeds in response to rotation of a shaft.

In accordance with the illustrated embodiment of this invention there is provided a plurality of gears rotatably mounted side by side in coacting relationship to form a train of rotational speed changing sections. A high speed prime mover drives the train of rotational speed changing sections, each of which is disposed to provide a selected rotational speed at an output gear thereof. An elongated pinion gear is rotatably mounted adjacent to the output gears. In addition a cam actuated lever is pivotally disposed adjacent to each of the output gears. An idler gear is rotatably mounted on each cam actuated lever adjacent to each output gear. A detent mechanism cooperates with the cam actuated levers to provide successive and single engagement of the idler gears rotatably mounted thereon with the successively selected output gears and the elongated pinion gear. Through such successive engagements the rotational speeds of the output gears are imparted to the elongated pinion gear thereby providing a multispeed output drive. Disengaging apparatus is also provided to disengage the idler gears from the output gears and the elongated pinion gear.

Other and incidental objects of this invention will be apparent from a reading of this specification and an inspection of the accompanying drawing in which:

FIGURE 1 is a front view of a multispeed transmission according to this invention;

FIGURE 2 is a sectional view taken along the line 2—2 of FIGURE 1; and

FIGURE 3 is a detailed view of a speed changing section of the reverted gear train included in a multispeed transmission according to this invention.

Referring to FIGURES 1, 2 and 3, there is shown a plurality of output gears 10, each being of equal diameter and each having a first driver gear 12 fixed concentrically thereon. In addition there is shown a plurality of driven gears 14, each having a second driver gear 16 fixed concentrically thereon. The second driver gears 16 have the same diameter so that each will mesh with an adjacent output gear 10. Though the first driver gears 12 and the adjacent driven gears 14 mesh, they have different ratios of diameters to provide selected rotational speeds at the output gears 10. These gears are rotatably disposed on two parallel shafts 18 and 19 to provide a reverted gear train comprising a plurality of successive speed changing sections 20. A reverted gear train is one in which the first driver gear and the last driven gear are mounted on the same shaft.

Each speed changing section 20 of the reverted gear train operates as follows: A first driver gear 12 meshes with and drives an adjacent driven gear 14. A second driver gear 16 is fixed concentrically to the driven gear 14 for rotation therewith. This second driver gear 16 meshes with and drives an adjacent output gear 10 imparting thereto a selected rotational speed. The next consecutive first driver gear 12 is fixed concentrically to the output gear 10 for rotation therewith to provide a drive for the succeeding speed changing section 20 of the reverted gear train. The reverted gear train is driven by an input drive comprising a high speed electric motor 22 which supplies the required rotational movement to an input shaft 24 having an input gear 26 mounted thereon. The input gear 26 meshes with and drives the first output gear 10 at a constant rotational speed which is reduced by the successive speed changing sections 20 of the reverted gear train to provide selected rotational speeds at successive output gears 10.

Another parallel shaft 28 having an elongated pinion gear 30 mounted thereon is disposed adjacent the output gears 10 of the reverted gear train. In addition an idler gear 32 is positioned adjacent to each of the output gears 10 except the first which is driven by the input gear 26. Each idler gear 32 is rotatably mounted at one end of a lever 34 that is pivotally connected at its distal end to still another parallel shaft 36. The levers 34 are each spring loaded by a resilient element 38 which bears against one side of a transmission housing 40. This spring loading urges the idler gears 32 towards engagement with the adjacent output gears 10 and the elongated pinion gear 30. A parallel cam shaft 42 having a cam 44 mounted thereon adjacent to each of the levers 34 is positioned to prevent simultaneous engagement of the idler gears 32 with the adjacent output gears 10 and the elongated pinion gear 30. Each cam is disposed to actuate its adjacent lever 34 in response to rotation of the cam through a predetermined angle, thereby permitting engagement of the corresponding idler gear 32 with its adjacent output gear 10 and the elongated pinion gear 30. Through this engagement the selected rotational speed of the output gear 10 is imparted by the idler gear 32 to the elongated pinion gear 30 which serves as an output drive.

The cams 44 are arranged such that each requires a greater angular rotation than the preceding one to actuate its adjacent lever 34. In addition the cams 44 are arranged such that when one lever 34 is actuated the others are deactuated. A detent mechanism 46 is concentrically connected to the cam shaft 42 to impart successively the angular rotation required by each cam 44 to actuate its adjacent lever 34. This provides a multispeed transmission wherein the rotational speed of the output drive is selected by rotation of the cam shaft 42.

The multispeed transmission of this invention is conveniently provided with disengaging apparatus comprising a further parallel shaft 48 having one flat side 50. The shaft 48 is rotatably disposed adjacent to the levers 34 such that when the flat side 50 is rotated into alignment with the levers 34 they function normally as described above. The shaft 48 is further disposed such that rotation of the flat side 50 out of alignment with the levers 34 prevents actuation thereof. Thus, the shaft 48 serves to disengage the idler gears from the output gears 10 and the elongated pinion gear 30. The shaft 48 may be connected by the proper linkage 52 to an additional parallel shaft 54 which is positioned coaxially within the cam shaft 42. This arrangement permits a disengaging apparatus control which is concentric with the detent mechanism 46.

I claim:

1. A multispeed transmission comprising:
    rotary means rotatably mounted for providing successive speed changing sections;
    first drive means operatively coupled to said first rotary means for coacting therewith;
    second drive means rotatably mounted adjacent to said rotary means and out of engagement therewith for being selectively coupled to one of said speed changing sections;
    engaging means including a plurality of idler members each of which is rotatably supported on a different support member adjacent to a different one of said speed changing sections and adjacent to said second drive means and including speed selection means for actuating said support members to selectively engage a single idler member with its associated speed changing section and with said second drive means while holding the remaining idler members out of engagement with their associated speed changing sections and said second drive means.

2. A multispeed transmission as in claim 1 including disengaging apparatus mounted for coacting with said engaging means to disengage all of said idler members from said speed changing sections and from said second drive means in response only to rotation of a shaft.

3. A multispeed transmission as in claim 1 wherein:
    said rotary means includes a plurality of rotary members rotatably mounted side by side in coacting relationship for providing successive speed changing sections each of which includes an output rotary member;
    said first drive means imparts rotational movement to said plurality of speed changing sections to provide each of said output rotary members with a selected speed; and
    said second drive means is rotatably mounted adjacent to said output rotary members.

4. A multispeed transmission as in claim 3 wherein said support members of said engaging means are pivotally mounted about an axis which is substantially parallel to the axis of said output rotary members, each of said pivotally mounted members being spring biased for engaging the idler member rotatably supported thereon with the output rotary member of its associated speed changing section and with said second drive means.

5. A multispeed transmission as in claim 4 wherein said speed selection means includes a plurality of cams each rotatably mounted adjacent to a different one of said pivotally mounted support members for coacting therewith to provide a selected speed, said cams having angularly displaced flat chordal portions for permitting said support members to successively and singly pivot the idler members rotatably mounted thereon into engagement with the output rotary members of their associated speed changing sections and with said second drive means in response to rotation of said cams in either rotational direction.

6. A multispeed transmission comprising:
    first and second parallel shafts having a plurality of gears rotatably mounted side by side in coacting relationship thereon for forming a gear train of rotational speed changing sections, each of said rotational speed changing sections including an output gear;
    first drive means operatively coupled to one of said plurality of gears for imparting rotational movement to said plurality of speed changing sections to provide each of said output gears with a selected speed;
    second drive means rotatably mounted adjacent to said output gears and out of engagement therewith for being selectively coupled to one of said output gears;
    support members each pivotally mounted adjacent to a different one of said speed changing sections about an axis which is substantially parallel to the axis of said output gears;
    idler gears each rotatably mounted on a different one of said support members for being pivoted into engagement with the output gear of its associated speed changing section and with said second drive means;
    speed selection means including a plurality of cams each of which is rotatably mounted adjacent to a different one of said support members for coacting therewith to selectively engage a single idler gear with the output gear of its associated speed changing section and with said second drive means while holding the remaining idler gears out of engagement with the output gears of their adjacent speed changing sections and said second drive means.

7. A multispeed transmission as in claim 6 including disengaging apparatus mounted adjacent to said support members for coacting therewith to disengage all of said idler gears from the output gears of said speed changing sections and from said second drive means in response only to rotation of a shaft.

8. A multispeed transmission as in claim 6 wherein:
    said gear train comprises a reverted gear train; and
    said speed selection means includes a detent mechanism operatively coupled to said cams for successively and singly engaging said idler gears with said output gears and with said second drive means to provide a selected speed.

9. A multispeed transmission comprising:
    a frame having a plurality of parallel shafts supported thereon;
    a plurality of gears rotatably mounted side by side in coacting relationship on first and second ones of said shafts to form a reverted gear train including successive rotational speed changing sections each having an output gear;
    first drive means operatively coupled to said reverted gear train for imparting rotational movement to said speed changing sections to provide each of said output gears with a selected speed;
    second drive means rotatably mounted adjacent to said output gears and out of engagement therewith for being selectively coupled to one of said output gears;
    spring biased support members each pivotally mounted adjacent to a different one of said speed changing sections about a third one of said shafts;
    idler gears each rotatably mounted on a different one of said support members for being pivoted into engagement with the output gear of its associated speed changing section and with said second drive means;
    a plurality of cams each mounted adjacent to a different one of said support members for rotation with a fourth one of said shafts to coact with the adjacent support member, said cams being angularly displaced for permitting said support members to successively and singly pivot the idler gears rotatably mounted thereon into engagement with the output gears of their adjacent speed changing sections and with said second drive means in response to rotation of said fourth shaft; and a detent mechanism operatively coupled to said fourth shaft for selecting the angular position thereof to select the speed of the multispeed transmission.

10. A multispeed transmission as in claim 9 including disengaging apparatus mounted adjacent to said support members for coacting therewith to disengage all of said idler gears from the output gears of said speed changing sections and from said second drive means in response only to rotation of a shaft.

References Cited by the Examiner
UNITED STATES PATENTS

| | | | |
|---|---|---|---|
| 2,538,625 | 1/1951 | Moore | 74—354 |
| 3,162,058 | 12/1964 | Matthew | 74—354 |
| 3,175,414 | 3/1965 | Wells | 74—337.5 |

DAVID J. WILLIAMOWSKY, *Primary Examiner.*

H. S. LAYTON, *Assistant Examiner.*